United States Patent [19]

Byram et al.

[11] 3,928,724

[45] Dec. 23, 1975

[54] VOICE-ACTUATED TELEPHONE DIRECTORY-ASSISTANCE SYSTEM

[75] Inventors: Harold E. Byram; Ronald J. Lockard; Roland D. Andersen; Vincent L. Carney, all of Lincoln, Nebr.

[73] Assignee: Andersen, Byram, Kouma, Murphy, Lockard & Carney, Lincoln, Nebr.

[22] Filed: Oct. 10, 1974

[21] Appl. No.: 513,562

[52] U.S. Cl. .......... 179/1 SD

[51] Int. Cl.$^2$ .......... G01L 1/08; H04M 1/26

[58] Field of Search .......... 340/172.5, 148, 149 R, 340/152 R, 173 AM, 173 SP; 179/1 SA, 1 SD, 7.1 R, 27 FF

[56] References Cited

UNITED STATES PATENTS

| | | | |
|---|---|---|---|
| 3,242,470 | 3/1966 | Hagelbarger | 340/172.5 |
| 3,445,594 | 5/1969 | Kusch | 179/1 SD |
| 3,742,143 | 6/1973 | Awipi | 179/1 SD |
| 3,792,446 | 2/1974 | McFiggins | 340/172.5 |

*Primary Examiner*—Thomas A. Robinson

*Attorney, Agent, or Firm*—Vincent L. Carney

[57] ABSTRACT

To provide voice-controlled automatic directory-assistance to telephone users, a user is connected to a central voice-actuated directory-assistance system upon dialing the uniform directory assistance number, which system provides recorded instructions and responds to the spelled name of the subscriber by providing coded digital signals to a computer. The computer identifies the subscriber from the digital code and addresses a memory of recorded information that causes the telephone to verbally inform the user of the subscriber's correct telephone number.

23 Claims, 9 Drawing Figures

VOICE-ACTUATED TELEPHONE DIRECTORY-ASSISTANCE SYSTEM

This invention relates to voice-actuated telephone directory assistance systems.

One requirement of an efficient telephone system is that users be able to obtain the telephone number of subscribers that are not listed in a local telephone directory or are listed incorrectly. Generally, this is obtained by dialing a directory assistance number, the dialing of which causes the telephone switching system to connect the user to a central directory assistance office which supplies the telephone number of a subscriber in response to information concerning the name of the subscriber.

In the prior art, the telephone switching system connects the user to an operator who receives the request for a telephone number and locates the number manually from a printed telephone directory or from a computer memory through a special desk console that displays the number. The operator then provides the user with the number or informs him that it is not available.

The prior art system is costly because it requires that operators be constantly on duty to provide directory assistance.

It has been proposed to provide hand encoders or an encoding system connected to each telephone to permit a user to send coded signals to a directory assistance station, in response to which the directory assistance station would provide a recorded verbal telephone number. This proposal, however, has been rejected as being: (1) too expensive because is requires a separate console unit for each telephone or a special procedure for using the dial of a telephone; and (2) too difficult for many users to operate.

It has also been proposed to provide equipment at the central directory assistance office, which equipment can convert the name of the subscriber whose telephone number is requested into a digital signal that is suitable for communication with a computer, can retrieve information from the computer indicating the telephone number of the party, can convert this information to an audio signal, and transmit it to the user. This proposal has been rejected because equipment which can reliably convert the names of subscribers into a digital code capable of communicating with a computer cannot be obtained at a reasonable cost.

Accordingly, it is an object of the invention to provide a novel telephone directory system.

It is a further object of the invention to provide a novel voice-actuated automatic telephone directory-assistance system.

It is a still further object of the invention to provide an inexpensive telephone directory system.

It is a still further object of the invention to provide a telephone directory assistance system which normally operates automatically without the intervention of live operators, but is simple enough so that it is suitable for use by a large proportion of the population.

It is a still further object of the invention to provide a voice-actuated telephone directory-assistance system which is relatively inexpensive and uncomplicated.

It is a still further object of the invention to provide a novel method or program for operating a telephone directory assistance system automatically.

In accordance with the above and further objects of the invention, a voice-actuated telephone directory-assistance system is provided having an audio-digital interface system, a computer and a telephone switching system for connecting a user at a local telephone to the audio-digital interface system.

The audio-digital interface system includes a voice encoder for converting audio messages from a user into electrical signals suitable for communication with a computer and a message memory capable of providing verbal communications to the user in response to signals from the computer. The message memory includes a memory for analogue audio signals such as a magnetic tape or disk or a digital-to-analogue audio signal generator.

The computer advantageously includes a main memory which stores information including the identification of subscribers and their telephone numbers, a system for addressing the main memory with information submitted by a user and a system for providing signals to the audio-digital interface system to address the stored messages in the message memory. The messages in the message memory provide a limited number of verbal messages to the user, such as for example; messages which include the instructions on the use of the system and the telephone numbers.

In the operation of the preferred embodiment, a user dials the uniform directory assistance number, causing the telephone switching system to connect the telephone to the audio-digital interface system and causing the first message to be provided to the user through his telephone receiver from the message memory. This message instructs him to spell letter by letter the last name of the subscriber whose telephone number he wants.

Each time a letter of the subscriber's last name is spelled, it is in the preferred embodiment encoded into digital form and stored in a register. The computer compares the stored digital signals with the digital signals representing subscribers stored in its main memory, and each time there is a match, causes the identification and telephone number of the subscriber to be stored in a first temporary memory and the number of such matches in reading through the entire main memory to be stored in a match counter. A selected one of three recorded messages is then transmitted to the user with the selected message corresponding to one of three different situations, which are: (1) one exact match between the user provided input and the stored addresses from the main memory of the computer; (2) no match; and (3) more than one match; and (4) one or more partial matches.

Firstly, if only one subscriber is found corresponding to the spelling of the last name, the telephone number is provided by the computer to the audio-digital interface system, which converts the digital signal received from the computer into an audio signal and transmits the audio signal to the telephone receiver being held by the user.

Secondly, if there is no subscriber corresponding to the spelling of the name provided by the user, the user is so informed and asked to provide alternate spellings or to hang up the receiver.

Thirdly, if there is more than one subscriber, the spelling of whose name corresponds to that provided by the user, the audio-digital interface system receives a signal from the match counter in the computer, causing an audio message to be transmitted to the telephone requesting the spelling of the first name letter by letter.

The letters of the first name of the subscriber are encoded and stored in the input register for comparison with the first names of the subscribers stored in the first temporary storage register, with matching names being read into a second temporary storage register. The appropriate one of the four messages described above is then transmitted to the user based on the comparison of names in the first temporary storage register with the first name and, if there is only one match, the telephone number is read from the second temporary storage memory. If there is more than one match, the above procedure is repeated using other information such as the address of the subscriber.

Fourthly, if there is one or more partial matches between the identification provided by the user and subscribers, the user is so informed and asked for alternate or additional information or given the telephone number or number together with a statement that the match or matches are partial.

In the main memory, names are stored both phonetically and by the exact spelling so that similar last names such as Johnson and Johnsen are included together with the user requested to resolve the conflict.

As can be understood from the above summary of the invention, the invention has several advantages such as: (1) it is usable by even relatively uninformed users; (2) reliable equipment is available recognizing the limited number of sounds needed for the directory assistance process; and (3) the system is relatively inexpensive.

The above-noted and other features of the invention will be better understood from the following detailed description when considered with reference to the accompanying drawings in which.

GENERAL DESCRIPTION

Figure 1:
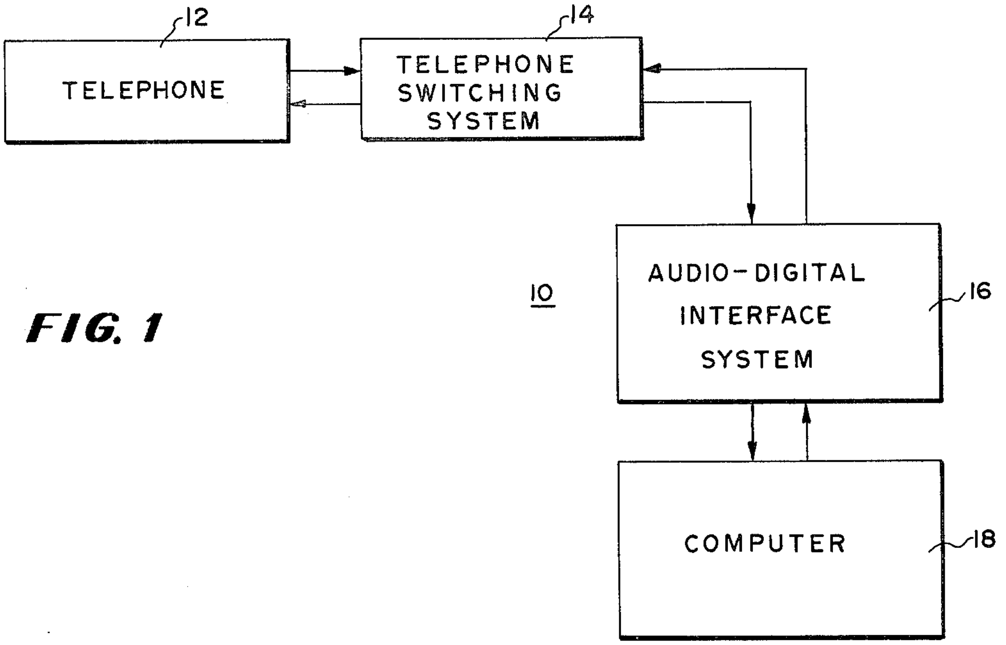
FIG. 1 is a block diagram of a voice-actuated telephone directory-assistance system in accordance with an embodiment of the invention.

In FIG. 1, there is shown a block diagram of a voice-controlled automatic telephone directory-assistance system 10 having a telephone 12, a telephone switching system 14, an audio-digital interface system 16, and a computer 18.

The telephone 12 and the telephone switching system 14 are conventional, with the telephone switching system 14 being connected to both the telephone 12 and the audio-digital interface system 16 to selectively provide electrical connections between the telephone 12 and the audio-digital interface system 16 upon the proper dialing of a directory-assistance number by the user of the telephone 12.

The audio-digital interface system 16 includes equipment which can receive audio frequency analogue electrical signals originating in the telephone 12 and convert them to an electrical digital code representing a letter of the alphabet and can receive an electrical digital code from the computer 18 and convert it to an audio frequency analogue signal that the telephone 12 is able to convert to a verbal message. It also includes certain switching equipment necessary to control the flow of signals between the telephone 12 and the computer 18.

The computer 18 includes a main memory capable of storing the telephone number of telephone subscribers and the necessary program and switching circuits to: (1) receive signals from the audio-digital interface system 16 indicating the name of a subscriber and other information such as his address; (2) search its main memory for the corresponding telephone number; and (3) transmit the telephone number, report that there is no listing corresponding to the subscriber's name or request further information to the audio-digital interface system 16. It also includes the necessary storage, program and logic circuits to resolve ambiguities in the digital signals received from the audio-digital interface system, such as multiple subscribers with the same name.

In operation, a user of the telephone 12 gains access to the audio-digital interface system 16 by dialing the proper access number or an area code followed by the access number, in response to which the audio-digital interface system 16 provides preliminary instructions to the user of the telephone 12 in the form of a verbal message.

In response to these instructions, the user of the telephone 12 spells the last name of the subscriber whose telephone number he is attempting to obtain or an area code followed by the last name according to the system and the audio-digital interface system 16 either; (1) obtains the telephone number from the computer 18 and provides it to the user of the telephone; (2) communicates with the user of the telephone to obtain further information necessary to obtain the telephone number from the computer 18; or (3) reports that there is no listing under the name provided by the user.

To obtain access to the audio-digital interface system 16, the user of the telephone 12 dials the uniform directory assistance number, in response to which the telephone switching system 14 connects the telephone transmitter 12 to the audio-digital interface system 16 in a conventional manner. This initial connection energizes a unit in the audio-digital interface system 16 to provide preliminary instructions to the user of the telephone 12.

To provide preliminary instructions to the user of the telephone 12, the audio-digital interface system includes recorded audio messages on a suitable memory such as addressable magnetic tapes or discs or digital-to-audio converters or the like. These preliminary instructions request the user of the telephone to spell the last name of the person whose number he wishes. The preliminary instructions may include requests for further information such as the city that is called or this information may be requested later in the operation when necessary to obtain a unique telephone number in response to the requested information.

To obtain the telephone number of a subscriber whose last name has been spelled, the audio-digital interface system 16 decodes each letter of the spelled name, converting it to a digital electrical signal. These digital signals are transmitted to the computer 18, which searches its main memory for similar last names.

If a single unequivocal match is obtained from the computer 18, it provides digital signals representing the telephone number of the subscriber to the audio-digital interface system 16, which converts the digital signals into the spoken language of the user of the telephone 12, prefaced by a recorded message indicating that this is the telephone number which was requested.

In the event that a match is not found by the computer 18, a different signal is provided to the audio-digital interface system 16 causing it to verbally indicate to the user that there is no such subscriber and to ask further questions.

If several matches are obtained, signals are provided to the audio-digital interface system 16 indicating several subscribers, in response to which the audio-digital interface system 16, requests further information from the user of the telephone, such as the spelling of the first name of the subscriber or the address of the subscriber.

If one or more close matches are obtained, signals are provided to the audio-digital interface system 16 indicating that a close match has been found and providing the telephone number, telephone numbers or other information concerning the subscriber or requesting further information about the subscriber.

SPECIFIC SYSTEM

Figure 2:
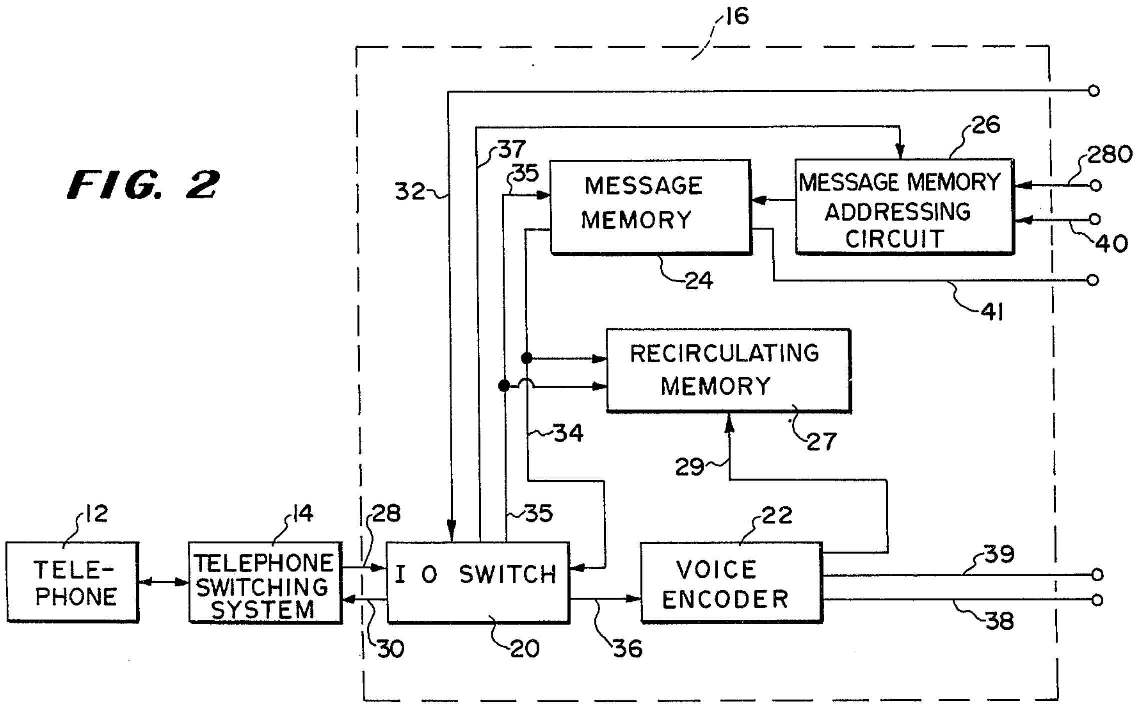
FIG. 2 is a block diagram of an audio-digital interface system which is a portion of the voice-actuated telephone directory-assistance system of FIG. 1.

In FIG. 2, there is shown connected to the telephone 12 through the telephone switching system 14, a block diagram of an embodiment of an audio-digital interface system 16, having an input-output switch 20, a voice encoder 22, a message memory 24, a message memory addressing circuit 26, and a recirculating memory 27.

To control the flow of information to and from the audio-digital interface system 16, the input-output switch 20 is connected: (1) to the telephone switching system 14 through the cables or conductors 28 and 30; (2) to the computer 18 through the conductor 32; (3) to the message memory 24 and recirculating memory 27 through the conductors 34, 35 and 37; and (4) to the voice encoder 22 through the conductor 36.

The conductor 32 provides a signal from the computer 18 to the input-output switch 20 when the message memory 24 has been addressed and ordered to provide a message to the telephone 12. Otherwise, the input-output switch 20 is open to receive communications from the telephone 12 through the telephone switching system 14 and to pass these communications to the voice encoder 22 for conversion to a digital signal to be transmitted to the computer 18 over conductor 28. Similarly, when a word is being received by the input-output switch 20, a signal is sent to the message memory 24 to inhibit transmission of audio messages and to the recirculating memory 27 to stop repetition of messages. The voice encoder 22, upon recognition of the word "repeat" causes repetition of an instruction in one embodiment. However, in other embodiments repetition occurs periodically until the user speaks, a predetermined amount of time elapses or after a predetermined number of repetitions.

Whenever the user 12 attempts to provide information to the system while the system is preparing to provide information to the use or is providing the information, the message memory addressing circuit 26 receives a signal over conductor 37 from the input-output switch 20, and in response thereto immediately or a predetermined time thereafter informs the user of the conflict, requesting him to stand by for the message from the system and then repeat his information if still necessary. The computer 18 or audio-digital interface system 16 retains sufficient information when interrupted to send its message at a later time.

Certain control words such as "stop" or "repeat" which the user, under some circumstances, is instructed to use after he has finished spelling the requested identification such as the last name, or when he does not understand an instruction, are recognized separately by the voice encoder 22 and are transmitted over separate conductors, one such conductor 39 being shown in FIG. 2.

The message memory 24 transmits audio-analogue signals representing verbal messages through the conductor 34 to the input-output switch 20 which transmits the audio signals carrying verbal messages through the telephone switching system 14 to the telephone 12 for communication to the user of the telephone.

To communicate with the computer 18, the voice encoder 22 receives analogue audio signals on conductor 36 from the input-output switch 20 and converts them to digital signals for application to the computer 18 through the conductor 38.

A suitable voice encoder is sold by Threshhold Technology Incorporated, Route 130 and Union Landing Road, Cinnaminson, New Jersey. This system is described in a paper by Marvin B. Herscher and Robert D. Cox, "An Adaptive-Isolated Word Speech Recognition System" presented at the 1972 Conference on Speech Communication And Processing. Another voice encoder system is described in U.S. Pat. No. 2,708,688 to Kalfaian, issued May 17, 1955.

To provide audio signals to the telephone 12, the message memory 24 is connected to the computer 18 (FIG. 1) through: (1) conductor 41 to signal the computer while it is transmitting; and (2) the message memory addressing circuit 26 which is connected to the computer 18 through conductor 40 to receive digital signals that cause the selected audio message to be transmitted to the input-output switch 20. The message memory 24 transmits audio signals through conductor 34 to the input-output switch 20 for transmission to the telephone 12 through the telephone switching system 14.

The message memory 24 includes a digital-to-audio signal converter or recorded audio signals such as on a magnetic tape or disc or the like, which are addressed by signals from the computer on conductor 40. The proper audio signals are applied through the conductor 34 to convey a message to the user of the telephone.

A recirculating memory 27 is included in some embodiments to cause an instruction to be periodically repeated until the user starts to talk or until a predetermined time elapses after the user has spoken or to be repeated whenever the user says "repeat" or for similar memory retention purposes.

Figure 3:
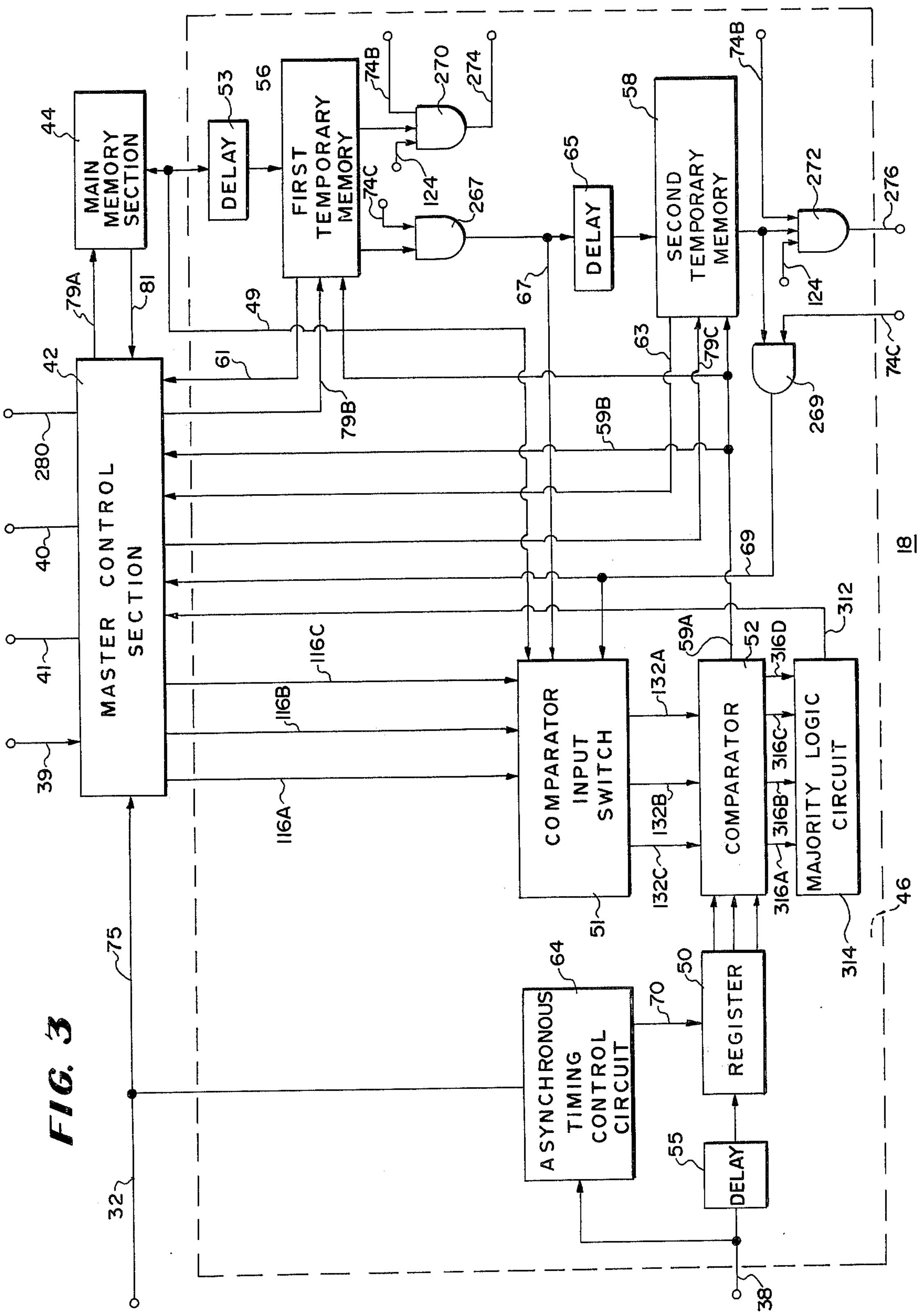
FIG. 3 is a block diagram of a computer, which is a portion of the voice-actuated telephone directory-assistance system of FIG. 1.

In FIG. 3, there is shown a block diagram of a computer system 18 having a master control section 42, a main memory section 44, and a selection section 46, connected together so that the selection section 46 receives the coded information from the audio-digital interface system 16 (FIG. 1) on conductor 38 and searches the main storage section 44 under the control of the master control section 42 until eventually it is determined that the name being searched for has been located and the telephone number obtained or that no telephone number is listed for the name.

To store the names, addresses and telephone numbers of telephone subscribers, the main memory section 44 includes any type of suitable storage mediums such as disc files, magnetic drums or the like which can be read and written into electrically under the control of the master control section 42 in a conventional manner.

To locate the telephone number of the subscriber, the selection section 46 includes an input register 50, a comparator input switch 51, a comparator 52, an asynchronous timing control circuit 54, first and second temporary memories 56 and 58, and majority logic circuit 314 connected together to locate the subscriber from identifying information supplied through conductor 38.

To compare the identified information received on conductor 38 from the interface section 16 (FIG. 1) with the information in the memory section 44, the digital signals transmitted over conductor 38 from the interface section 16 (FIG. 1) are stored in register 50 for application to the comparator 52 in parallel. During storage of this information, the asynchronous timing control circuit 54 receives signals from conductor 38 and generates timing pulses in response thereto, which timing pulses are applied to the master control section 42 through the conductor 75, to the register 50 through the conductor 70 and to the input-output switch 20 through the conductor 32 to maintain the system in synchronism.

To indicate a match and to store the matching subscriber identification, the comparator 52 has a first set of inputs connected to the register 50 and a second set of inputs connected to the comparator input switch 51 to compare signals in the register 50 with the serial readout from the memory section 44 and has its match signal output connected to conductors 59A and 59B which it provides signals when the information stored in the register 50 is identical to the information being read from the memory section 44.

To indicate that a number of the characters but not all of the characters stored in the register 50 match the characters of the blocks of information being read from the memory section 44, the majority logic circuit 314 has each of a plurality of the input conductors 316A–316D connected to the output of a different one of the stages of the comparator 52 and its output connected to the master control section 42 through conductor 312 to provide a signal indicating a partial match. The number of characters that must match or the ratio of matching characters to total characters can be preset with known majority logic circuits to provide an output indicating a partial match.

In an embodiment that transmits a message indicating a partial match together with the subscriber identification and telephone numbers to the user, an enlarged memory system is required having one additional component analogous to the delay 53, first temporary memory 56, gate 67, gate 270, delay 65, second temporary memory 58, gate 269 and gate 272 connected to the master control program, in a manner analogous to the set of components shown in FIG. 3 but connected to the majority logic circuit 314 through conductor 312 rather than to the comparator 52 through conductor 59. If only a message indicating the partial match is to be transmitted to the user, the second set of components is unnecessary but the majority logic circuit 314 is nevertheless connected to the master control section 42 through the conductor 312.

In the preferred embodiment, the main memory section 44 is a serial readout memory such as a tape memory or a disc file or the like in which certain information can be stored. However, in other embodiments, a random access memory is used. In embodiments using a random access memory, the temporary memories are lower in capacity since they only need store addresses to the main memory rather than full data on subscribers.

In embodiments including a random access memory when the first character stored in the register 50 is a particular letter of the alphabet, the main memory section 44 is addressed immediately to the category of subscribers having only that letter. This can be accomplished by connecting the first output of the register 50 through an addressing circuit to the main memory section 44 in a manner known in the prior art. A serial readout of the main memory to the comparator 52 is then performed in the manner described hereinafter for other letters in the name. When a system of this type is used, it may not be necessary to store the matches of the first memory search in the temporary memory, but the addresses may be stored by themselves and read to the comparator 52 on the next search if a multiple listing of subscribers is located.

To control the reading of information from the memory section 44, the output conductor 49 of the main memory section 44 is connected to the first temporary memory 56 through a time delay 53 and to the comparator input switch 51. The output conductor 59A from the comparator 52 is directly connected to both the first and second temporary memories 56 and 58 and the output conductor 59B is connected to the master control section 42 to indicate to each of these units when a match is obtained between information from a memory unit and information in the register 50, with the output conductors 116A and 79A from the master control section 42 being connected to the comparator input switch 51 and the main memory section 44 respectively to control these units.

The first temporary memory 56 receives information from the main memory section 44 through the time delay 53 which is longer than the delay in the comparator input switch 51. It records this information in response to a signal on conductor 59A indicating a match and a signal on conductor 79B from the master control section 42, which energizes the first temporary memory when the main memory 44 is being searched, thus recording only information concerning subscribers having the same last name as that stored in the register 50.

The second temporary memory 58 is connected to the comparator 52 through conductor 59A, to the master control section 42 through the conductor 79C and to the output from the first temporary memory 56 through a time delay 65, with the outputs from the first and second temporary memories 56 and 58 being connected to the comparator input switch 51 through AND gates 267 and 269 and conductors 67 and 69 to permit comparison of information in the first temporary memory 56 and application of it to the second temporary memory 58 upon the indication of a match by the comparator 52, the comparator input switch 51 controlling the serial readout to the comparator 52 in synchronism with clock pulses. Thus, the second temporary memory only records information concerning subscribers stored originally in the first temporary memory and have the same first name as that stored in the register 50.

The AND gates 267 and 169 are opened by signals on conductor 74C from an ambiguity resolver (FIG. 4) in the master control section 42 to route the output from the temporary memories to the comparator input switch 51 only when there is more than one subscriber, with the two AND gates 270 and 272 routing the outputs to the master control section 42 through conductors 274 and 276 under the control of pulses on conductor 74B from the ambiguity detector when only one subscriber is located and bit timing pulses from conductor 124.

The reading of information to and from the main memory section 44, the first temporary memory 56 and the second temporary memory 58 are all done synchronously under the control of a central clock (not shown). The asynchronous timing control circuit 54 is used to control the reading of information into the register 50 since the voice encoder (FIG. 2) operates asynchronously with the computer 18 in the preferred embodiment, although it would be possible to synchronize the voice encoder to the main computer and temporarily store the digital characters once they are generated from the spelled letters and words transmitted to the encoder.

The basic clock pulses originate in a timing unit (not shown separately) that generates bit pulses, character pulses, word pulses or field pulses and information block pulses that control the synchronous transfer of information within the computer. The character clock pulses apply one pulse for each series of bits representing one letter or number or control word or the like. The word pulse, which is the same as the field pulse in this computer, is generated each time a complete unit of information such as a first name, last name, or address is read from or written into memory. The block of information or block pulse is generated once for each unit of information comprising all of the stored information concerning one subscriber.

The comparator input switch 51 connects a different one of the fields of the blocks of information representing different subscribers being read through it from the memory to the comparator 52 depending on whether the information is sent from the main memory section 44, the first temporary memory 56 or the second temporary memory 58, and for this purpose, is connected to each of the memory sections and to the master control section 42 which includes circuitry to indicate to the comparator input switch which memory is providing information to the comparator 52.

This change in fields occurs because the last names of subscribers transmitted from the main memory section 44 to the comparator input switch 51 are first compared to the last name in the register 50 and then the first names of subscribers from the first temporary memory are compared with a first name in the register 50. Since the last name is in the first field and the first name is in the second field of a block of information, successive fields are applied to the comparator 52.

Although the preferred embodiment includes equipment to select different fields to be compared, a comparator could be constructed that would compare the entire block of information with any particular identification being stored in the register 50.

To send information to the memory addressing circuit 23, the conductors 40 and 280 are connected to the master control section, which section includes a logic unit (FIG. 4) that provides coded messages from the ambiguity resolver in response to which the audio-digital interface system 76: (1) indicates to a user of the telephone 12 that there is no subscriber corresponding to the identification provided or provides information such as in the case where a close but not exact match is found between information provided by the user and the recorded identification of a subscriber; (2) requests further information; or (3) provides a telephone number to the user.

While in the preferred embodiment the message memory 24 generates audio signals for messages from digital signals sent by the comparator, it is possible instead to record audio signals within a memory, such as the main memory section 44, in the computer 18 and to transmit the audio signals directly through the interface section 16 to the telephone 12 for conversion to verbal messages.

To prevent having information transmitted from the master control section 42 to the message memory addressing circuit 26 on conductor 40 while the user is providing information, the conductor 41 is connected to the master control section 42 and prevents the gating of information to conductors 40 and 280 when information is being transmitted through the input-output switch 20 (FIG. 2) to the voice encoder from the telephone 12.

Figure 4:
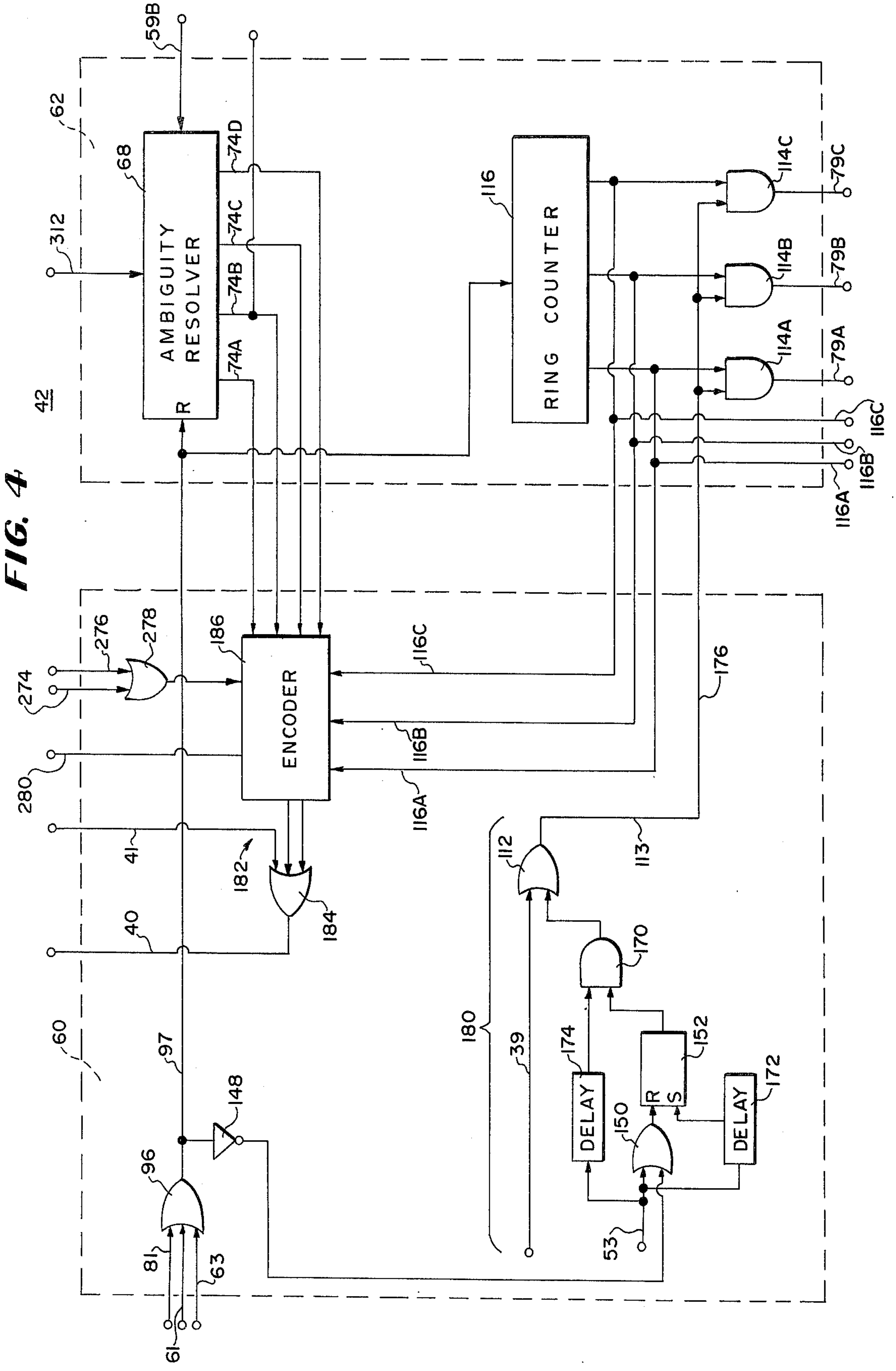
FIG. 4 is a block diagram of a master control section which is a portion of the computer shown in FIG. 3.

In FIG. 4, there is shown a block diagram of the master control unit 42 having a message control unit 60 and a logic control unit 62.

The logic control unit 62 includes a ring counter 116 and an ambiguity resolver 68, with the ring counter 116 having its count input terminal electrically connected to each of the conductors 81, 61 and 63 through the OR gate 96 in the message control unit 60 to step one position each time a different one of the main memory section 44, the first temporary memory 56 and the second temporary memory 58 are read to the comparator input switch 51.

To select the next temporary memory into which information is to be read or from which a telephone number is to be read for eventual transmission to the interface system 16, a plurality of AND gates 114A–114C each have one of their two inputs connected to a corresponding one of the outputs 116A–116C of the ring counter 116 to be energized in accordance with the particular memory into which information is about to be read and have their other inputs each connected to the conductor 176 which provides a pulse at the end of the spelling of information by the user of the telephone 12 so that one of the particular AND gates 114A–114C is opened to energize a particular one of the main memory section 44 (FIG. 3), the first temporary memory 56 or the second temporary memory 58 and to indicate the identification has been read into the register 50 (FIG. 3).

The OR gate 278 receives the code identifying subscribers on either conductor 274 or 276 and applies it to the encoder 186 for transmission to the message memory addressing circuit through the cable 280.

To indicate to the encoder 186 in the message control unit 60 which message is to be sent to the audio-digital interface system 16, the outputs 116A–116C of the ring counter 116 and the outputs 74A–74C of the ambiguity resolver 68 are connected to the encoder 186 in a manner to be described hereinafter.

To provide an output signal to the encoder 186 indicating the number of subscriber identifications that were found corresponding to the information in register 50, the three outputs 74A through 74C of the ambiguity resolver indicate the number of matches in the previous scan. The conductor 74B is also connected to each of the memories to enable a readout from that memory when there is one unique subscriber located by a comparison of the information in the register 50 and the memory.

To indicate the number of previous instructions to the user and previous scans of the memory, the output conductors 116A–116C of the ring counter 116 are connected to the encoder 186, thus enabling the encoder 186 to select the instruction requesting a first name or address in the event that the outputs 116A–116C indicate that the last scan found more than one subscriber.

To determine the number of subscribers corresponding to the input information in the register 50 (FIG. 3), the ambiguity resolver 68 receives a signal on conductor 59 indicating each match by the comparator 52 and receives signals from each of the conductors 81, 61 and 63 through the OR gate 96 indicating that a memory has been searched.

To control the time at which operations are initiated, the message control unit 60 includes an end-of-word detector indicated generally at 180, and a message transcriber indicated generally at 182.

To indicate the end of a word written into the register 50 for identification of a subscriber, the end-of-word detector 180 includes two OR gates 112 and 150, and AND gate 170, two time delays 174 ad 172 and a flip-flop 152.

To detect the end-of-word signal resulting from the spoken control word "stop" by the user, the conductor 39 from the voice encoder 22 (FIG. 2) is connected to one of the two inputs of the OR gate 112 and the output of the AND gate 170 is connected to the other of the two inputs of the OR gate 112, with an output conductor 113 being connected to the output of the OR gate 112 to carry the end-of-word signal on conductor 176 from the message control unit 60 whenever the control word indicating the end of a spelled word is pronounced by the user of the telephone 12.

To provide a signal to the other of the inputs of the OR gate 112 after a predetermined time has passed between the pronunciation of one letter of the name and another by the user of the telephone 12 without the control word being spoken, the conductor 53 which receives end-of-character signals from the asynchronous timing control circuit 54 (FIG. 3), is connected to the set terminal of the flip-flop 152 through the time delay 172 so that the flip-flop 152 is set after each character is spoken and applies an output to one of the two inputs of the AND gate 170, which AND gate will be opened after a period of time to pass an end-of-word signal through the OR gate 112 unless another end-of-character signal is first received.

To reset the flip-flop 152, the output of the OR gate 150 is connected to the reset input terminal of the flip-flop 152 and one of the two inputs of the OR gate 150 is electrically connected to conductor 53 so that the flip-flop is set by end-of-character pulses and then reset a short time later by the same pulses applied through delay 172. The other input to the OR gate 150 is connected through an inverter 148 to the output of OR gate 96 to receive signals indicating a readout from one of the memories on any one of conductors 81, 61 or 63.

To apply a pulse to the OR gate 112 a period of time after the last character, the end-of-character signals from conductor 53 are applied through the delay 174 to one input of the AND gate 170, the other input of the two-input AnD gate 170 being connected to the output terminal of flip-flop 152, with the output of the AND gate 170 being connected to the OR gate 112 so that if the flip-flop 152 is set by a character and is not reset by another character signal being applied to conductor 53 nor by a memory readout signal from OR gate 96 before the first end-of-character signal passes through the time delay 174 to the AND gate 170, and end-of-word signal is applied through the OR gate 112, causing the AND gates 114A–114C to be opened and a signal to be applied on conductor 113 to read the memory for comparison with input identification.

Although in the preferred embodiment the signal from the AND gate 170 indicates the end of a word and starts a memory search operation, this signal may in other embodiments be used for other purposes as well. For example, it may initiate an instruction to the user or disconnect the user to let the user know he has delayed too long and should start over or connect the user to a live operator for help.

To send coded messages to the message memory addressing circuit 26, the encoding system 182 includes an AND gate 184 and an encoder 186, with the encoder 186 being electrically connected to conductors 74A–74D and to conductors 116A–116C to receive information indicating the particular memory into which data has been read and indicating if there are no listings, one listing, or more than one listing of subscribers corresponding to identification in the register 50.

Two outputs of the encoder are connected to two of the three inputs of AND gate 184 to provide a coded serial output message and prevent the AND gate from opening prematurely; and a third of the three inputs to AND gate 184 is connected to conductor 41 to gate the message only when there is no incoming message from the telephone 12, with the output of the AND gate 184 being connected to the message memory addressing circuit 26 (FIG. 2) through conductor 40. The encoder 186 includes circuitry for converting the signals on conductors 74A–74D and 116A–116C into discrete codes indicating that there is: (1) no listing corresponding exactly or nearly to the information from the user so the user can be so informed; (2) one unique listing so that the telephone number can be read from the memory to the addressing circuit; (3) more than one listing so that the memory addressing circuit can address the proper request for more information; or (4) no exact listing but one or more listing that only differ slightly from the information requested by the user. In some embodiments the fourth code is not used and listings close to that requested are treated as not existing until the user supplies better information.

Figures 5, 6, 7:
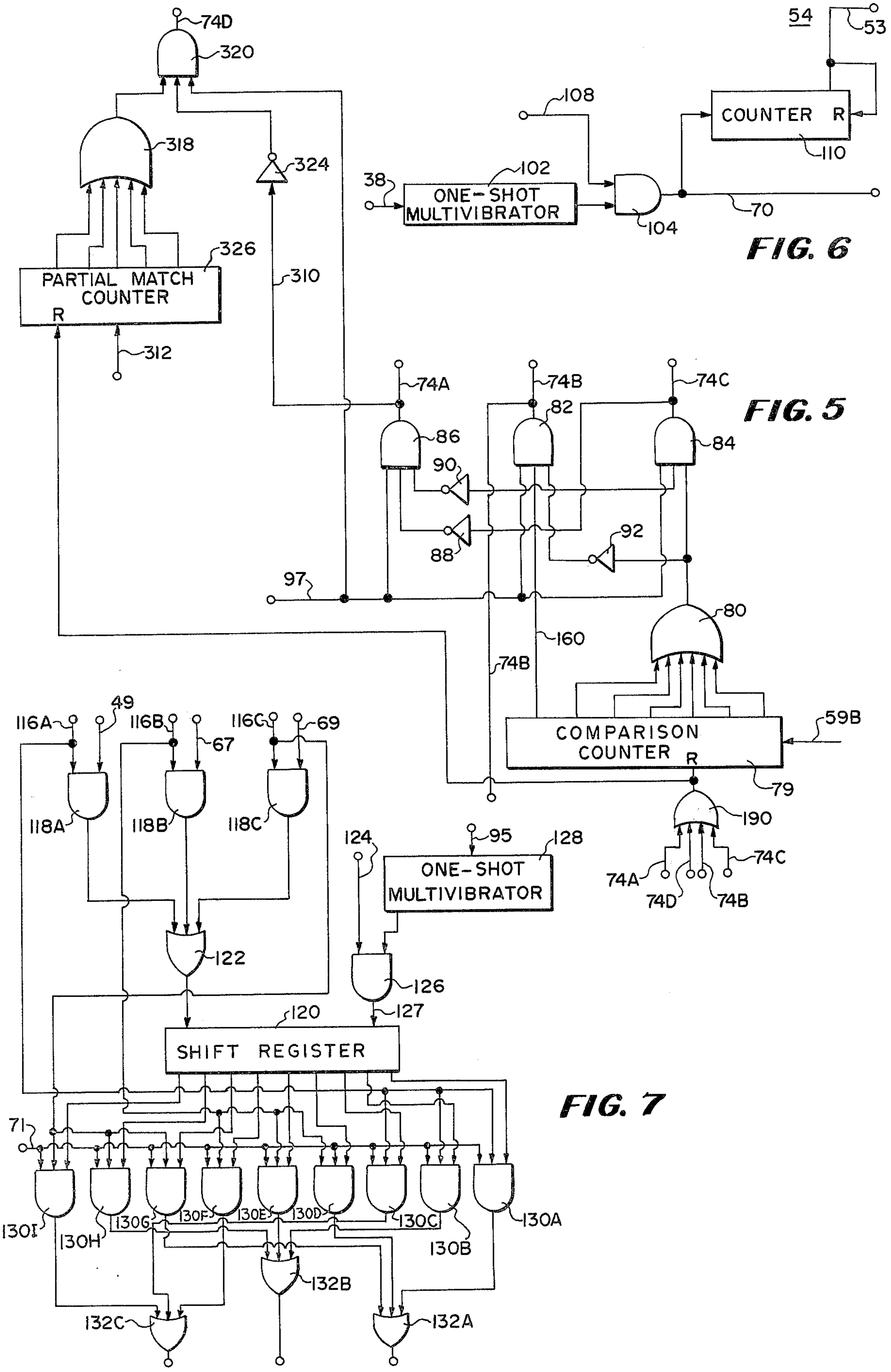
FIG. 5 is a logic circuit diagram of an ambiguity resolver which is a portion of the master control section shown in FIG. 4.
FIG. 6 is a block diagram of an asynchronous timing control section which is a portion of the computer of FIG. 3.
FIG. 7 is a logic circuit diagram of a comparator input switch which is a portion of the computer of FIG. 3.

In FIG. 5, there is shown a logic circuit diagram of the ambiguity resolver 68 having a comparison counter 79, three OR gates 80, 190 and 318, four AND gates 82, 84, 86 and 320, four inverters 88, 90, 92 and 324 and a partial match counter 326 which cooperate to indicate the presence of no subscribers, one subscriber, more than one subscriber or a partial match corresponding to the identification provided by the telephone user.

To receive a count indicating the number of exact matches between the stored identification of the subscribers and the information from a user, the count input terminal of the binary comparison counter 79 is connected to the output of the comparator 52 through a conductor 59B. The reset terminal of counter 79 is connected to the output of the OR gate 190, which has its three inputs connected to conductors 74A–74D to reset the counter once a determination has been made about the existence and nature of a match.

The lowest order output 160 of the counter 79 is connected to one of the two outputs of: (1) the AND gate 86 through the inverter 90 to indicate that there has not been one unique match between an input identification and a stored subscriber's identification; and (2) the AND gate 84 and the AND gate 82 to indicate at least one such match. The other outputs of the counter 79 are each connected to a different one of the inputs of the OR gate 80, with the output of the OR gate 80 being connected to the other input of the AND gate 82 through an inverter 92 to indicate the absence of a plurality of matches and directly connected to the other input of the AND gate 84 to indicate that there are a plurality of matches, the other input of the AND gate 86 being connected to the AND gate 84 through the inverter 88 to indicate the absence of a plurality of matches.

To receive a count indicating the number of partial matches between the stored identification of the subscribers and the information from a user, the count input terminal of the partial match counter 326 is connected to the output of the majority logic circuit 312 (FIG. 3) through the conductor 312. The reset terminal of counter 326 is connected to the output of OR gate 190 to be reset once a determination has been made about the existence and nature of a match.

To provide a signal to conductor 74D when there is no unique match and are one or more partial matches, the AND gate 320 has: (1) its output connected to conductor 74D to provide a signal when opened; (2) one of its three inputs connected to each of the outputs of the partial match counter 326 through the OR gate 318 to receive a signal only when there is a partial match; (3) a second of its three inputs connected to conductor 74A through the inverter 324 to receive an input only when there is no unique match; and (4) the third of its three inputs connected to the output of OR gate 96 (FIG. 4) to receive an input only after the memory section has been completely searched.

The partial match output conductor 74D may be connected to different units to serve different purposes such as: (1) only to the encoder 186 (FIG. 4) to provide a message to the user informing him of the close match but not identifying the close match so the user can try alternate names or other information; (2) to the encoder and a memory system analogous to the first temporary memory 56 and its associated gates and delay lines to inform the user of the close match or matches and provide him with all of the close subscribers so he can make a choice; and (3) to the encoder and a full memory system including a plurality of temporary memories and gates analogous to that shown in FIG. 3 for the outputs 74A–74D to request further information from the user and select the best close match based on this additional information. Moreover, the output 312 (FIG. 3) from the majority logic circuit 314 and the output 59 from the comparator 52 can be applied to an OR gate (not shown) with the output of the OR gate being connected to the same units that the conductor 59 is connected to in FIG. 3 and with no other connections to conductor 312 except for the majority logic circuit 314 so that close matches are combined with exact matches during each search.

Each of the AND gates 86, 82, 84 and 320 has the remaining of its three inputs electrically connected to the output of the OR gate 96 (FIG. 4) through conductor 97, the OR gate 96 (FIG. 4) having inputs connected to conductors 81, 61 and 63 to open the selected one of the gates 86, 82 and 84 only after a complete search of one of the memories in the computer 18.

With these connections, the output of the AND gate 86 indicates that there are no telephone subscribers corresponding to the identification provided by a telephone user, the output of the AND gate 82 indicates that there is one unique telephone subscriber for such a person, and the output of the AND gate 84 indicates that there is more than one subscriber satisfying the identification.

To indicate to a user of the telephone 12 that there is no listing for a subscriber corresponding to the identification provided by the user, the output from the AND gate 86 is connected to the encoder 186 (FIGS. 4 and 8) which provides a code through conductor 40 to the message memory 24, causing the message memory to provide a verbal message to the user.

To indicate that there is one subscriber corresponding to the identification provided by the user and to provide the telephone number to the user, the output of the AND gate 82 is connected through conducter 74B to the encoder 186, which provides a signal to conductor 84 to inform the user that the telephone number of the subscriber will follow and to the selection section 46 (FIG. 3) to gate the telephone number from the memory in which it is stored to the message memory 24.

To provide the telephone number of the one subscriber to the user, the output of the AND gate 82 is connected to one of the two inputs of the AND gates 270 and 272 through the conductor 74B to open the one of these two gates connected to the temporary memory storing the telephone number for a readout to the audio-digital interface system.

To request further information from the user in the case of more than one subscriber having identification corresponding to that provided by the user, the AND gate 84 applies a signal through conductor 74C to the encoder 186 which provides a code to conductor 40. The code cooperates with a signal received from one of the conductor 74A–79C (FIG. 4) indicating the memory of the computer 18 that has received the identification of subscribers to cause the message memory addressing circuit 26 and the message memory 24 to request either the spelling of the first name or the address or similar information depending on which one of the memories has stored this identification, since the memory which has stored the identification corresponds to the number of searches previously performed.

The comparison counter 79 is the type of counter which stores in succession binary ones corresponding to each pulse received on conductor 59B, the remainder of the pulses being binary zeros. It is reset at the end of a search operation, by a signal on one of conductors 74A–74D which are connected to the reset terminal through the OR gate 190 (FIG. 4).

The output from AND gate 84, and in one embodiment the output from 320, also starts another search cycle, the search being made of identification in the temporary memory next in series from the previous memory searched, with matching identification being stored in another temporary memory. This search is in accordance with new information provided by the user in response to instructions.

In FIG. 6, there is shown a logic circuit diagram of the asynchronous timing control circuit 54 having an AND gate 104, a one-shot multivibrator 102 and a counter 110.

The conductor 38 is connected to the input of the one-shot multivibrator 102, which one-shot multivibrator 102 has a time constant that keeps it saturated for a period of time equivalent to the time required for one character to be read through conductor 38 from the voice encoder 22. The output of the one-shot multivibrator 102 is connected to one of the two inputs of the AND gate 104, the other input of the AND gate 104 being connected to a source of clock pulses (not shown) through the conductor 108 to pass clock pulses to conductor 70 and to the counter 110 whenever the one-shot multivibrator 102 has been triggered to its conducting condition, this permitting clock pulses from the conductor 108 to pass through the AND gate 104 to conductor 70 and counter 110. These clock pulses are sufficient in number to read exactly one character into the register 50 (FIG. 3).

The counter 110 has a number of outputs equal to the number of bit positions in a character from the voice encoder 12, with the last output being connected to conductor 53 and to the reset input of the counter 110. With this arrangement, conductor 53 is energized each time that the character has been read into the register 50 from clock pulses on conductor 108.

In FIG. 7, there is shown a logical circuit diagram of the comparator input switch 51 having a shift register 120, a one-shot multivibrator 128, a plurality of AND gates 130A–130I, 118A–118C and 126 and a plurality of OR gates 132A–132C and 122.

To read information into the shift register 120 from the main memory, the first temporary memory or the second temporary memory, the output of OR gate 122 is connected to the input of the shift register 120, with the first of three inputs of the OR gate 122 being connected to the output of AND gate 118A, the second of the three inputs of the OR gate 122 being connected to the output of AND gate 118B, and the third of the three inputs of the OR gate 122 being connected to the output of AND gate 118C.

To enable the last names of the subscribers to be compared with information in the register 50 (FIG. 3) during the first search of the subscribers stored in the main memory section 44, the AND gate 118A has one of its two inputs connected to conductor 116 which receives information from the main memory section 44 during its search and has the other of its two inputs connected to conductor 49 which is energized at the start of any memory search. The conductor 116 is also connected to one of the two inputs of each of the three AND gates 130A–130C, the other input of each of these gates being connected to corresponding ones of the first three stages of the shift register 120 so that data from the main memory is read through AND gate 118A and OR gate 122 into the shift register 120, with the first field containing the coded last name of subscribers for each subscriber being read out of the AND gates 130A–130C through OR gates 132A–132C into the comparator 52 for comparison with infomation stored in the register 50.

To enable the first names of subscribers to be compared with information in the register 50 (FIG. 3) during the second search of subscribers in the first temporary memory 56, one of the two inputs of AND gate 118B is connected to conductor 116 which receives a signal until the first temporary memory has been searched and the other of its two inputs is connected to conductor 67 to be energized during a search of the first temporary memory to read information from the first temporary memory into the shift register 120. The conductor 116B is also connected to one of the two inputs of each of the three AND gates 130D–130F, the other input of each of the AND gates 130D–130F being connected to corresponding ones of the second three outputs of the shift register 120 to read the second field of the identification stored in the first temporary memory through the OR gates 132A–132C into the comparator 52 for comparison with the information stored in the register 50.

To enable the addresses of subscribers to be compared with information in the register 50 (FIG. 3) during the third search of subscribers in the second temporary memory, one of the inputs of AND gate 118C is connected to conductor 116C to be energized when the third temporary memory has been searched and the other input is connected to conductor 69 to be energized during a search of the third temporary memory. The conductor 116C is also connected to one of the three inputs of each of the AND gates 130G–130I to read the last three bits from the identification stored in the register 50.

The third input of each of the AND gates 130A–130I is connected to a block clock pulse source through conductor 71 in the memory units to read the gates connected to the selected word or field outputs when the shift register 120 has received one complete block of information. The AND gate 126 has one input connected to the output of the one-shot multivibrator 128 and the other input connected to a source of bit clock pulses on conductor 124, with conductor 95 receiving character clock pulses and running on the one-shot multivibrator 128 to provide clock pulses to the shift register 120 through conductor 127 to shift data in lengths equivalent to one character of data stored in the memories.

Figure 8:
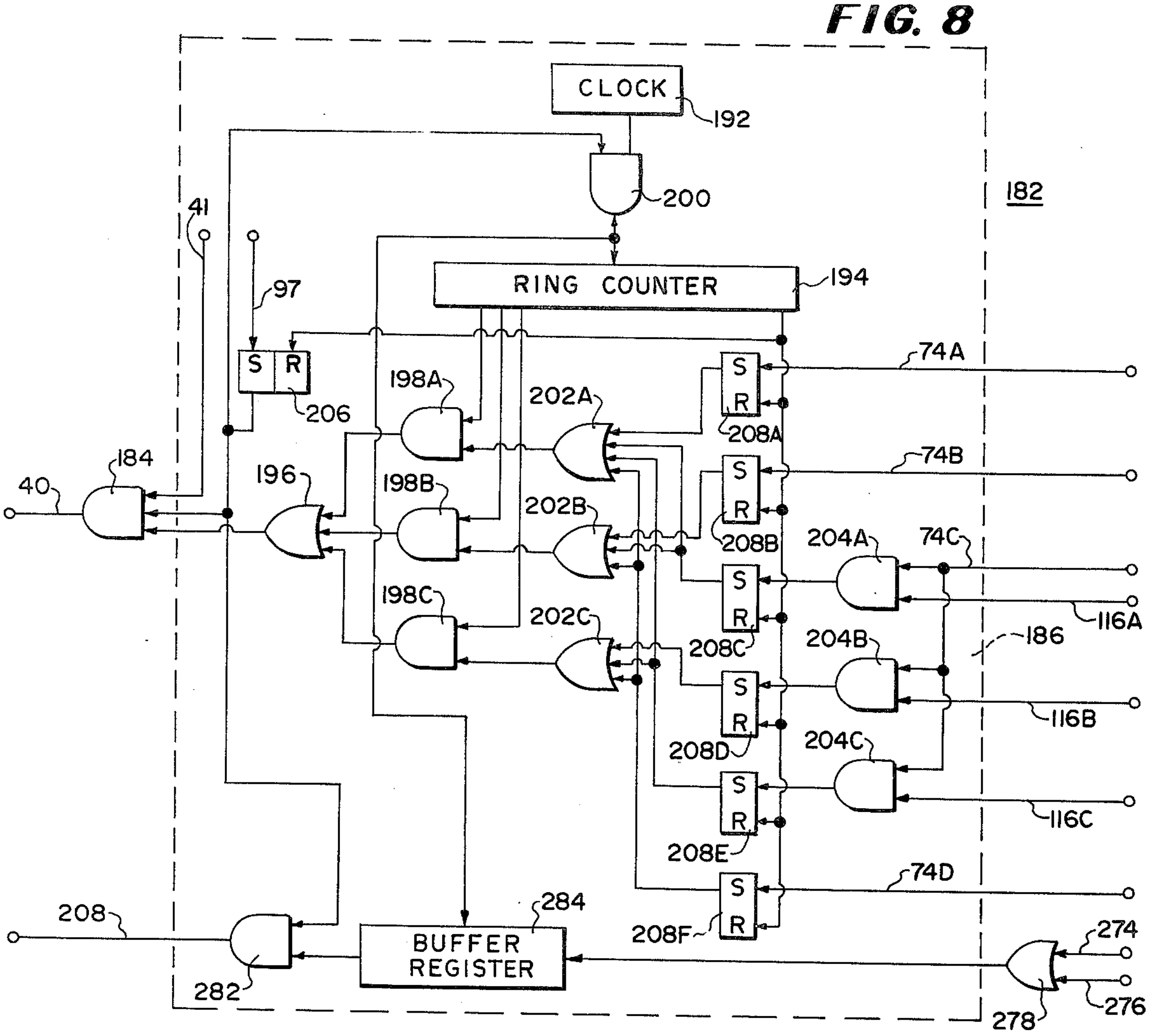
FIG. 8 is a logic circuit diagram of an encoder which is a portion of the master control section of FIG. 4.

In FIG. 8 there is shown a logic circuit diagram of the encoding circuit indicated generally at 182 having an AND gate 184, an OR gate 278, and an encoder 186 with the AND gate 184 and the OR gate 278 being connected to receive signals from the encoder 186. The encoder 186 includes a clock pulse generator 192, a ring counter 194, four OR gates 196 and 202A–202C, eight AND gates 200, 198A–198C, 204A–204C and 282, seven flip-flops 206 and 208A–208F, and the buffer register 284.

To generate and store a binary code representing the conditions of no subscriber corresponding exactly to the identification, in the main memory in one embodiment or no partial nor exact match in another embodiment, the conductor 74A is connected to the set input of flip-flop 208A, the output of which is connected to one of the inputs of the OR gate 202A.

To generate and store a binary code representing one subscriber and the telephone number of the subscriber, the conductor 74B is connected to the set input of flip-flop 208B, the output of the flip-flop 208B being connected to one of the three inputs of the OR gate 202B. The output of the OR gate 278 is connected to the input of the buffer register 284 to write the block of information concerning the subscriber into the buffer register.

To generate and store a binary code representing more than one subscriber and the next search criteria required, the conductor 74C is connected to one of the two inputs of each of the AND gates 204A–204C, the other input of the AND gates 204A–204C receiving a different one of the conductors 116A–116C, the outputs of the AND gates 204A–204c each being connected to the set input of a different one of the flip-flops 208C–208E, with the outputs of the flip-flops 208C–208E being connected to OR gates 202B, 202C and 202C and 202A respectively.

To generate and store a binary code representing the condition of a close match in an embodiment in which the user is notified of the existence of close matches, the conductor 74D is connected to the set input of the flip-flop 208F, the output of the flip-flop 208F being connected to one of the inputs of the OR gates 202A, 202B and 202C. This connection is not necessary if partial matches are to be ignored or treated completely the same as full matches but is useful in an embodiment in which the user is informed of the existence of a close match but not given subscriber identification and embodiments in which the identification of all close matches is given. In an embodiment in which additional information is requested of the user to select the closest partial match the encoder is expanded to include circuitry analogous to the AND gates 204A–204C and flip-flops 208C–208E. Moreover, additional AND gate 198 and OR gate 202C is required to generate extra codes and the appropriate messages are added to the message memory to be addressed by the message memory addressing circuit 26 in response to these codes.

With these connections, the condition of no subscriber results in a binary one output on the OR gate 202A–202C, the condition of one subscriber results in a binary two outputs, the condition of more than one subscriber in the main memory results in a binary three output, the condition of more than one subscriber in the first temporary memory results in a binary four output, the condition of more than one subscriber in the second temporary memory results in a binary five output, and the condition of a partial match results in a binary six output.

To read the binary code serially to conductor 40, each of three successive stages of the ring counter 194 are connected to successive ones of the AND gates 198A–198C, with the other input of each of these AND gates being connected to the outputs of the corresponding OR gates 202A–202C, so that, as the ring counter counts from positions one to three successive bits of the code indicating the five or six conditions are read from the AND gates 198A–198F. The outputs of AND gates 198A–198F are each connected to three inputs of the OR gate 196, the output of which is connected to one of the inputs of AND gate 184 to be read to conductor 40 upon receiving a pulse on conductor 41 indicating that there is no input information from the encoder 22 and a pulse from the set terminal of flip-flop 206 indicating that a memory search has been completed.

To control the timing of the reading of the code and the resetting of registers, the AND gate 200 has one of its inputs electrically connected to the bit clock pulse generator 192 and the other of its inputs connected to the output of the flip-flop 206, with the output of the AND gate 200 being connected to the ring counter 194 and the count input of the buffer register 284 so that the AND gate 200 is opened whenever a memory search has been completed to permit clock pulses to be applied to the ring counter 194 and to the buffer register 284 for counting thereby. The flip-flop 206 is designed to have sufficient delay to permit the flip-flops 208 to be set before starting the readout.

The fourth stage of the ring counter 194 resets the flip-flop 206 each of the flip-flops 208A–208E and itself at the fourth count. The output from the buffer register 284 is read through AND gate 282 to conductor 208, the AND gate 282 being opened by a pulse from the set terminal of flip-flop 206.

Figure 9:
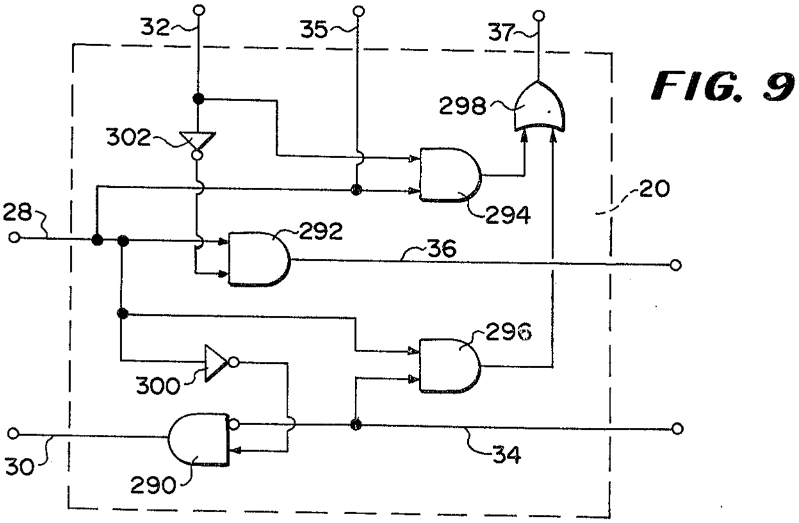
FIG. 9 is a logic circuit diagram of an input-output switch which is a portion of the audio-digital interface system of FIG. 2.

In FIG. 9, there is shown a logic circuit diagram of the input/output switch 20 having four AND gate 290, 292, 294, and 296, an oR gate 298, and two inverters 300 and 302.

To permit signals from the telephone switching system 14 (FIG. 2) to be applied to the voice encoder 22 through conductor 36 (FIG. 2) only when no signal from the computer is being applied to line 32 to indicate that a message is about to be sent, the conductor 28 which connects the input/output switch 20 to the telephone switching system 14 is connected to one input of the AND gate 292, the other input of the AND gate 292 being connected through the inverter 302 to the conductor 32, with the conducter 36 being connected to the output of the AND gate 292 to receive the signals applied to conductor 28 only when the conductor 32 is not receiving a signal from the computer.

To apply signals from the message memory 24 to the telephone switching system 14 only when the telephone switching system 14 is not attempting to apply signals to the input/output switch 20, the AND gate 290 has one input connected to the conductor 34 which receives signals from the message memory 24, the other of its two inputs being connected through the inverter 300 to the conductor 28, with the output of the AND gate 290 being connected to conductor 30 so that conductors 34 and conductor 30 are connected through the open gate 290 only when there is no signal being applied to the conductor 28.

The conductor 35 is directly connected to the conductor 28 to indicate to the message memory 24 that a signal is being received from the telephone switching system 14 so that the message memory 24 can be inhibited and the recirculating of signals through the memory 27 terminated if it is applying periodic messages to the conductor 30.

To apply a signal to conductor 37 indicating that the user is sending messages at the same time that the automatic directory-assistance system is attempting to send messages to the user, the conductor 37 is connected to the output of the OR gate 298. One input of the OR gate 298 is connected to the output of the AND gate 294, which has one of its inputs connected to conductors 28 and 35 and the other of its two inputs connected to conductor 32 so as to be opened whenever a signal is being received from the telephone switching system 14 on conductor 28 and either from the computer on conductor 35 or from the message memory on conductor 32. The other input of the OR gate 298 is connected to the output of the AND gate 296, one of the inputs of the AND gate 296 being connected to conductor 28 and the other being connected to conductor 34 so as to apply a signal to the OR gate 298 whenever a message is being received from the message memory 24 and from the telephone switching system 14 at the same time.

With these connections, the signals on conductor 37 indicates a conflict and may be used to address the message memory addressing circuit 26, causing it to send a message stored in the message memory 28 to the user informing him of the conflict that he may stand by for instructions from the automatic directory-assistance system or may terminate his use of the system and start over if this is required.

SPECIFIC OPERATION AND PROGRAM

In operation, the user of a telephone 12 (FIG. 1) that wants to obtain the telephone number of a subscriber dials directory-assistance, in response to which he receives instructions to spell the last name of the subscriber from the voice-controlled automatic directory-assistance system 10. The directory-assistance system encodes the letters of the last name and searches the stored names of subscribers to obtain a match between the spelled name and a subscriber's name. If there is no match or if there is a single subscriber corresponding to the name, the user is informed that there is no such subscriber or is given the telephone number of the subscriber. If there is more than one subscriber with the spelled name, the user is requested to supply further information and the search is completed with the further information.

When the user dials the directory-assistance number, the telephone switching system 14 (FIG. 1) connects the telephone 12 being used by the user to an audio-digital interface system 16. In doing so, the telephone switching system 14 operates in substantially the same manner as it does when a user dials an operator-controlled directory-assistance system except that it connects the user to an input-output switch 20 (FIG. 2) of the audio-digital interface system 16 rather than to the live telephone operator in a directory-assistance office.

Upon connection to the input/output switch 20, a signal is sent to the message memory 24 over conductor 35 which causes a recorded message to be played back through the input-output switch 20 and the telephone swtiching system 14 to the telephone 12 of the user. This recorded message instructs the user to spell the last name of the subscriber, the telephone number of whom he wishes to obtain. Preliminary information such as the area code or state may also be requested.

To search the list of subscribers stored in the main memory section 44 (FIG. 3) upon receiving a spelled last name by the user, the spelled words are applied from the input-output switch 20 through conductor 36 to a voice encoder 22 which generates digital signals representing the letters of the alphabet that are spelled and applies these signals to the register 50 through the conductor 38 and delay line 55. control words such as "stop" and numbers pronounced digit by digit are also encoded and applied through conductor 39 to the master control section 42, with the word "stop" being said according to the instructions given to the user when he is finished spelling the last name.

To read the coded characters into the computer 18 (FIG. 3), the character representing a letter or word is applied from conductor 38 to the register 50 through the delay 55 and at the same time to the asynchronous timing control circuit 54, which controls the reading of the character into the register 50 and applies timing signals to the master control section 42.

To control the writing of the character into the register 50 and the application of a timing pulse to the master control section 42, the asynchronous timing control circuit 54 (FIG. 6) receives the first bit of digital character from conductor 38 on the input of the one-shot multivibrator 102, which responds by applying a positive pulse to one input of the AND gate 104 for a period of time equal to the time required for one character to be generated by the voice encoder 22, with the other input to the two-input OR gate 104 being connected to a source of clock pulses through the conductor 108 so that, when a character representing a spelled letter or word is applied to the conductor 38, a pulse is applied to the AND gate 104 from the one-shot multivibrator 102 which passes timing pulses from the conductor 108 that are equal in number to the length of one character from the voice encoder 22.

To generate the timing pulses for reading the word from conductor 28 into the register 50 and for application to conductor 53, the conductor 70 is connected to the output of AND gate 104 so that as soon as the first bit of word on conductor 38 (FIG. 3) has passed through the delay 55 and is at the input of the register 50, the timing pulses on conductor 70 begin reading the character into the register. The output from AND gate 104 is also connected in number to the number of bits in a character from the voice encoder 22, with the output of the counter 110 being connected to conductor 53 so that the counter applies a static pulse to conductor 53 when the last bit has been read into the register 50 by timing pulses on conductor 70, with the pulse on conductor 53 being applied to the master control section 42.

The control character applied to conductor 39 is preferably a single pulse rather than a character of the standard number of bits. Of course, other length characters can be used for the control characters if necessary, and in some embodiments, it is not necessary to use a control character applied to conductor 39 but other measures may be used to determined the end of a word, such as measuring the time lapse after the last character has been read into the register 50 and treating the end of a spelled identification by the user as a period of time after the last character has been read into the register. A message with instructions can be played back to the user under the control of the end-of-word signal informing the user that a search is being performed and giving instructions about what to do if he had not finished the spelling. The spelled message from the user can also be recorded and played back as a check with the user being instructed to start over if there is an error.

To search for the telephone number corresponding to a last name spelled by the user, the computer 18 applies the words representing the last name to the comparator 52 from the register 50 (FIG. 3) and compares this word in parallel with the first field of each of the identifying words stored on the main memory 44. Each time a match is found between the first field of the data stored in the main memory section 44 and the word applied to the comparator 52 from the register 50, or a partial match in one embodiment, the entire data for that individual stored in the main memory section 44 is read into the first temporary memory 46; a binary one is added to the counter 79 in the ambiguity resolving circuit 68 (FIG. 5) of the master control section 42 and; in one embodiment, a binary one is added to the partial match counter 326 in the event of a partial match.

To apply the input word from the register 50 to the comparator 52, the input word is read character by character into the register 50 from line 38, with each bit of each character being counted into the register by pulses generated on conductor 50 under the control of the asynchronous timing control circuit 54. The output stages of the register 50 are connected in parallel to the comparator 52, which receives a corresponding number of inputs from the comparator input switch 51 to compare the word stored in the register 50 with a corresponding word read through the comparator input switch 51.

Each time a control word indicating the end of one identification input is applied to conductor 39 from the voice decoder 22, the pulse on line 39 is passed by OR gate 112 to each of the three gates 114A–114C, an output pulse on the one of the conductors 79A–79C receiving a static potential from the ring counter 116 resulting in one of the memories of the computer being energized to read data to the comparator input switch 51 for comparison with the input word in the comparator 52. In this case, where it is the first comparison, the first output of the ring counter is energized and an output is applied through conductor 114A to conductor 79A to begin a readout from the main memory section 44: (1) through the conductor 49 into the comparator switch 51, which is in its first position to apply the first field of all the identifying words to the comparator 52 in series for comparison with the word in register 50; and (2) to the first temporary memory 56 which records the information only upon receiving a signal from the comparator 52 on conductor 59A indicatiing a match.

To select the field from the identification of each subscriber during the reading of the main memory 44, a pulse is applied from the AND gate 114A on conductor 116A to the AND gate 118A (FIG. 7) to pass the readout on conductor 49 to the input of the shift register 120 through the OR gate 122. At this time, information is read into the shift register from bit clock pulses applied from the clock (not shown) connected to conductor 124 through AND gate 126, which is energized by the one-shot multivibrator 128, under the influence of a pulse on conductor 113.

The first field of each word is read from AND gates 130A–130C by pulses applied from conductor 116A to these AND gates and by block clock pulses applied to conductor 71, the other input of each of these AND gates being connected to the first order output of the shift register 120. The bits from AND gates 130A–130C are read through OR gates 132A–132C into the comparator 52 for comparison with the input word in register 50 (FIG. 3).

Each time the comparator 52 determines that the field being compared is identical to the information in register 50, a pulse is applied through conductor 59D to the master control section 42, where a one is recorded in the comparison counter 79 (FIG. 5) of the ambiguity resolver 68. This pulse is also applied to the first temporary memory 56, causing the identification to be read through the delay 53 into the first temporary memory 56 upon application of a pulse from conductor 79B to the first temporary memory.

When the entire store identification of subscribers in the main memory 44 has been compared with the first identification word by the comparator 52, the main memory applies a signal through conductor 81 to OR gate 96 (FIG. 4) which causes a readout of the ambiguity resolver 68 (FIGS. 4 and 5) and is applied through inverter 148 (FIG. 4) and OR gate 150 to the reset terminal of the flip-flop 152, resetting this flip-flop.

The ambiguity resolver 68 selects the next step that is to be performed in accordance with the count within the comparison counter 79. This count indicates if: (1) no subscriber having the identification inserted in register 50 (FIG. 3) was found; (2) only one such subscriber was found; or (3) more than one subscriber was found. In one embodiment, the comparison counter 79 cooperates with the partial match counter 326 to initiate a fourth source of action when there is no exact match but one or more partial matches.

If no subscribers having the name submitted by the user are found, there is no count in the comparison counter 79 thus resulting in the conductor 160 applying binary zero to one of the inputs of AND gates 81 (FIG. 5) and a binary one to one of the inputs of AND gate 86 through the inverter 90. Conductor 74C connected to the output of AND gate 84 through inverter 88 applies a binary one to one of the inputs of AND gate 86 when the pulse on conductor 81 is received since the output of AND gate 84 is a binary zero, this AND gate indicating that there is not more than one subscriber. Accordingly, AND gate 86 applies a pulse to conductor 74A upon application of the pulse originating on conductor 81.

In one embodiment, if no subscribers having the name submitted by the user are found but there is a partial match, a pulse is provided to conductor 74D which provides information to the user and may cause a readout of the partial match or matches or initiate a further search of partial matches.

The pulse from conductor 74A is applied to the encoder 186 (FIG. 4) which transmits a signal to the message memory address circuit 26 (FIG. 2), on conductor 40 (FIGS. 4 and 8) resulting in the addressing of the message memory 24 to play a recorded message back to the user of the telephone 12 (FIG. 2) informing the user that there is no such subscriber and requesting that he try an alternate spelling of the subscriber.

If there has been only one subscriber with a name corresponding to that encoded and applied to the register 50, a binary one is applied to conductor 160 and all other conductors receive a binary zero, resulting in a binary zero being applied to one of the inputs of AND gate 82 by the conductor 160, a binary zero being applied to the corresponding input of the AND gate 86 from conductor 160 through the inverter 90 and a binary one being applied into a corresponding one of the inputs of the AND gate 84, with the AND gate 84, receiving a binary zero from the OR gate 80, thus causing AND gate 82 to be the only AND gate receiving binary ones on all three of its inputs.

In response to the binary ones, AND gate 82 applies a pulse to conductor 74B, with the signal on the conductor 74B being applied to the message memory addressing circuit 26 to address the message memory 24 through the encoder 186, thus causing the message memory to read a recording to the user of the telephone 12 (FIG. 2) informing him that the following telephone number is that of the subscriber he requested. The output on conductor 74B is also applied to AND gate 270 (FIG. 3), causing a readout of the subscriber identification including the telephone number to the buffer register 284 (FIG. 8), which applies it to the message memory 24 later, causing a playing back of the encoded information in audio form to the user of the telephone 12.

If more than one subscriber with the same last name has been located, a binary one is applied to conductor 160 and to one of the other conductors connected to the OR gate 80 from other outputs of the comparison counter 79. This results in: (1) a binary one being applied by conductor 160 to one of the inputs of AND gate 82 and one of the inputs of AND gate 84; (2) a binary zero being applied to a corresponding one of the inputs of AND gate 86 through the inverter 90; (3) the output of OR gate 80 applying a binary one to one of the inputs of the AND gate 84; (4) a binary zero being applied to a corresponding one of the inputs of the AND gate 82 through the inverter 92; and (5) a binary zero being applied to a corresponding input of the AND gate 86 from conductor 74C from the output of AND gate 84 through the inverter 88. The pulse from 81 thus results in a binary one being applied to all three inputs to AND gate 84 causing a binary one output on conductor 74C, with the other AND gates 82 and 86 having a binary zero output.

The output on conductor 74C is applied to the message memory addressing circuit 26 through the encoder 186 (FIG. 4), causing the message memory addressing circuit 26 to address the message memory 24 to read to the user of the telephone 12 a message requesting further information such as the first name of the subscriber.

When the user spells the first name of the subscriber, the information is entered through the input-output switch 20 and the voice encoder 22 into the register 50 in the same manner as the last name, resulting in a parallel presentation of the characters representing the first name to the comparator 52. The output from OR gate 96 has heretofore been applied to the ring counter 116 causing it to apply a pulse to an AND gate 114B, resulting in an output to conductor 79B and 116B and removing the binary one output from conductors 79A and 116A.

When a pulse is applied to conductor 39 (FIG. 4) or AND gate 170 indicating the end of a word, the AND gate 114 is energized, causing a pulse to be applied through conductor 79B to the first temporary memory 46 and from conductor 116B to the comparator switch 51.

The comparator input switch 51 receives the signal on conductor 116B together with a signal on conductor 67 from the first temporary memory causing the second field AND gates 134A–134C to be opened and the coded first names applied through the OR gates 132A–132C to the comparator 52 as the first temporary memory 56 is read into the comparator switch. This causes a comparison to be made between the information in the first temporary storage memory which caused a match in the comparator when the full list of the main memory section 44 was read with the first name provided by the user. Each time an identification in the first temporary storage memory matches with the information in the register 50, the identification is stored in the second temporary store 58, which is receiving the read out from the first temporary memory through the time delay 65. The process is then repeated in the same manner as it was for the main memory section 44 to determine if there is no subscriber, one such subscriber or more than one such subscriber and to inform the user.

Additional temporary storage registers may be used to resolve further conflicts relying upon further information such as the addresses of the subscriber. Moreover, if the last register includes identification of more than one subscriber, provision is made to read all the subscribers to the user.

While it would be possible to store in the temporary memories only addresses of identification of subscribers in the main memory section and to rely on these addresses for further selection rather than storing the entire identification in the temporary memories, it is more economical to read the entire matching identification into the first and second temporary memories rather than only the addresses in the main memory of the identification since there is a relatively large amount of information stored in the main memory section and only a relatively small number of matches will be found at any one run to the main memory section.

While a special purpose computer has been described to perform functions of automatic voice-controlled directory assistance to telephone users, it should be understood that many of the functions described in being performed by hardware herein can be performed by a properly programmed general purpose computer. For example, a general purpose computer can be programmed to search its memory for matching last names, letter-by-letter and to: (1) provide the telephone number to the audio-digital system 16 with an appropriate instruction when one match is found; (2) signal the audio-digital system 16 when no match is found or provide an address or code that results in the user being informed of the lack of a subscriber; or (3) jump to a subroutine that requests further information and makes a new search if more than one match is found. It is considered within the scope of this invention to utilize such general purpose computers and the necessary software to perform such functions when appropriate.

While a preferred embodiment of the invention has been described with some particularity, many modifications and variations in the preferred embodiment are possible in the light of the above teachings without deviating from the invention. Therefore, it is to be understood that, within the scope of the appended claims, the invention may be practiced otherwise than as specifically described herein.

What is claimed is:

1. A voice-actuated automatic directory-assistance system adapted to be connected to a telephone switching system for communication with any of a plurality of telephones comprising:

signal carrier means for receiving audio signals from said telephone switching system representing the names of subscribers;

return signal means for supplying audio signals to the telephone representing at least the telephone numbers of said subscribers in response to the audio signals from said signal carrier means;

said signal carrier means including means for receiving audio signals from said telephone switching system representing at least letters of the alphabet;

said return-signal means including conversion means for converting each of the audio signals representing letters of the alphabet to a signal compatible with a computer memory system and for applying said signals to said computer memory system.

2. A voice-actuated automatic directory-assistance system in accordance with claim 1 in which the return signal means further comprises means for sending prerecorded audio signals to said telephone switching system to provide messages to the user of said telephone-switching system.

3. A voice-actuated automatic directory-assistance system in accordance with claim 2 comprising:

interface means for converting audio signals representing spoken language to a digital code; and means for recognizing the end of each word of said spoken language and for applying an end-of-word signal indicating the end of this word.

4. A voice-actuated automatic directory-assistance system in accordance with claim 3 further comprising:

computer means for searching a memory for information corresponding to the information received from said interface means, whereby telephone numbers may be obtained from said computer means; and means for initiating said searching operation upon receiving said end-of-word signal.

5. A voice-actuated automatic directory-assistance system adapted to be connected to a telephone switching system for communication with any of a plurality of telephones, comprising:

signal carrier means for receiving audio signals from said telephone switching system representing at least letters of the alphabet;

interface means for converting each of the audio signals representing letters of the alphabet to a digital code and for applying said digital code to a computer in a form compatible with the computer.

6. A voice-actuated automatic directory-assistance system in accordance with claim 5 in which said interface means includes means adapted to be connected to a computer for converting a digital signal received from said computer to an analogue signal for communication to said telephone.

7. A voice-actuated automatic directory-assistance system in accordance with claim 6 in which said signal carrier means further includes means for receiving audio signals from said telephone switching system representing at least letters of the alphabet, numerals and control words.

8. A voice-actuated automatic directory-assistance system according to claim 6 further including computer means for searching a memory for information corresponding to the information received from said interface means, whereby a telephone subscriber's telephone number may be obtained from said computer means.

9. A voice-actuated automatic directory-assistance system according to claim 8 in which said computer means includes:

storage means for storing subscriber identification;

input register means for storing said digital signals received from said interface means;

comparison means for comparing said digital signals received from said interface means with said information in said storage means and for generating a match comparison signal each time said digital signals received from said interface means are identical with at least a portion of said information in said storage means; and means for reading information from said storage means upon energization of said comparator by a match comparison signal.

10. A voice-actuated automatic directory-assistance system according to claim 9 in which said computer means further includes:

temporary storage means for receiving and storing a portion of said subscriber identification from said memory means upon receiving said match comparison signals; and means for determining if there is one or more than one matching subscriber identification in said temporary storage means.

11. A voice-actuated automatic directory-assistance system according to claim 10 further including means for reading telephone numbers into said interface means upon an indication that only one address is stored in said temporary memory means.

12. A voice-actuated automatic directory-assistance system according to claim 8 further including:

computer means for searching a memory for information corresponding to the information received from said interface means, whereby subscriber identification is obtained from said computer means;

said computer means including means for addressing said memory in accordance with a selected character of said subscriber identification;

means for searching the address of said memory means in accordance with further characters of said subscriber identification.

13. A voice-actuated directory-assistance system according to claim 7 further comprising:

memory means;

computer means for searching said memory means for information corresponding to said signal received from said carrier means, whereby subscriber identification can be obtained from said computer means;

comparator means for generating first, second and third comparison signals;

said comparator means including first signal means for generating said first comparison signal after said memory has been searched if no information corresponding to said subscriber identification has been found, second signal means for generating a second comparison signal when identification of a single subscriber only has been found after a search of said memory corresponding to said identification received from said carrier means; and third signal means for generating a third comparison signal when identification of more than one subscriber has been found corresponding to the identification provided from said carrier means; and readout means for reading said identification of a single subscriber to said interface means from said memory in response to said second comparison signal.

14. A voice-actuated automatic directory-assistance system in accordance with claim 13 further comprising means for sending prerecorded audio signals to said telephone switching system to provide messages to the user of said telephone switching system in response to said first and said third comparison signals.

15. A voice-actuated automatic directory-assistance system in accordance with claim 14 further including means for repetitively sending said message and means for terminating said repetitive sending of said message upon receiving an audio signal from said telephone switching system.

16. A voice-actuated automatic directory-assistance system adapted to be connected to a telephone switching system for communication with any of a plurality of telephones comprising:

signal carrier means for receiving audio signals from said telephone switching system representing the names of subscribers;

return-signal means for supplying audio signals to the telephone representing at least the telephone numbers of said subscribers in response to the audio signals from said signal carrier means;

interface means for converting audio signals representing spoken language to a digital code; and means for recognizing the end of each word of said spoken language and for applying an end-of-word signal indicating the end of this word.

17. A voice-actuated automatic directory-assistance system in accordance with claim 16 further comprising:

computer means for searching a memory for information corresponding to the information received from said interface means, whereby telephone numbers may be obtained from said computer means; and means for initiating said searching operation upon receiving said end-of-word signal.

18. A voice-actuated automatic directory-assistance system in accordance with claim 15 further including means for sending a prerecorded message to said telephone switching system upon receiving an audio signal from said telephone switching system at the same time as the different message is being sent to the telephone switching system.

19. A voice-actuated automatic directory-assistance system in accordance with claim 18 further including means for generating a code representing different ones of said messages.

20. A method of providing subscriber telephone numbers to telephone users upon request comprising:

connecting a telephone user to a central voice-actuated automatic directory-assistance station upon the dialing of a predetermined number on the telephone by the user;

instructing the user with a recorded message upon said connection to spell the last name of the subscriber, the telephone number of whom he wishes;

encoding the spelled last name of the subscriber into a signal compatible with a computer memory;

transmitting said signal compatible with a computer memory to a register for addressing computer memory;

addressing the computer memory to obtain information concerning subscribers having the last name requested by the user.

21. A method according to claim 20 further including the steps of:

sending a recorded message to the user in the event that there is no subscriber with the last name requested, which message informs the user that there is no subscriber with such a last name;

sending to the user the telephone number of the subscriber when there is a single subscriber having a last name provided by the user; and sending a recorded message to the user requesting that the user provide further identification of the subscriber.

22. A method according to claim 21 further comprising the steps of:

instructing the user to pronounce the control word when he is done spelling the last name of the subscriber;

initiating a search upon receiving the control word pronounced by the user.

23. A method according to claim 22 further comprising the steps of:

comparing the identification of a subscriber provided by a user with corresponding identification of subscribers stored in the memory bank of a computer;

recording at another memory location the identification of subscribers corresponding to that provided by the user;

requesting the user to provide further identification of the subscriber; and comparing said further identification of subscribers with identification of the subscriber stored in said other location of the memory.

* * * * *